No. 798,974. PATENTED SEPT. 5, 1905.
W. C. POOLE.
WHEEL TIRE MACHINE.
APPLICATION FILED OCT. 17, 1904.
2 SHEETS—SHEET 1.
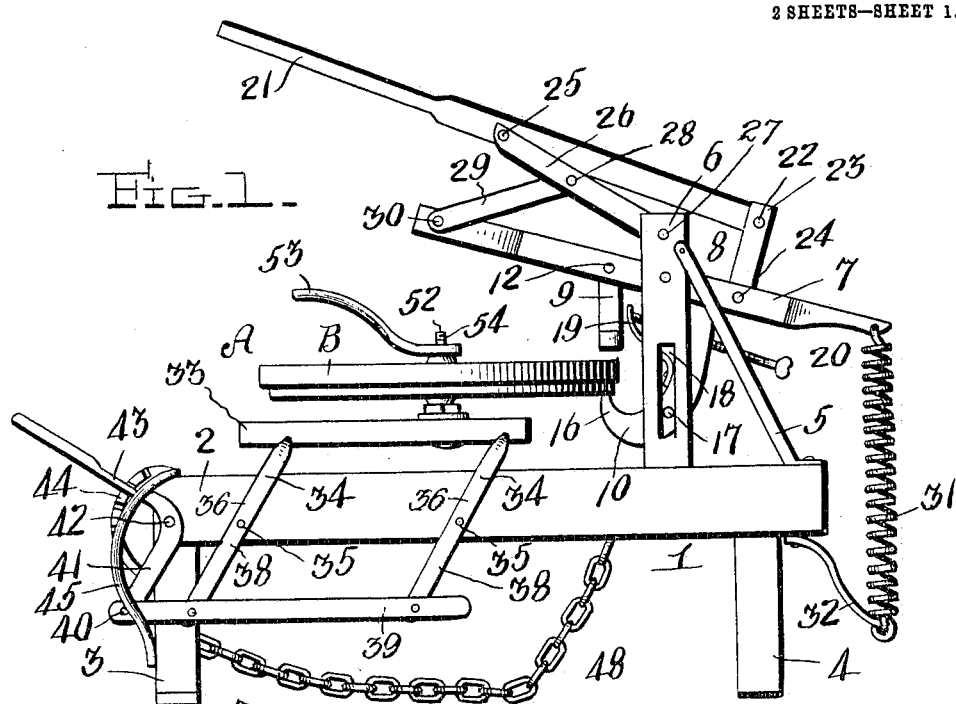
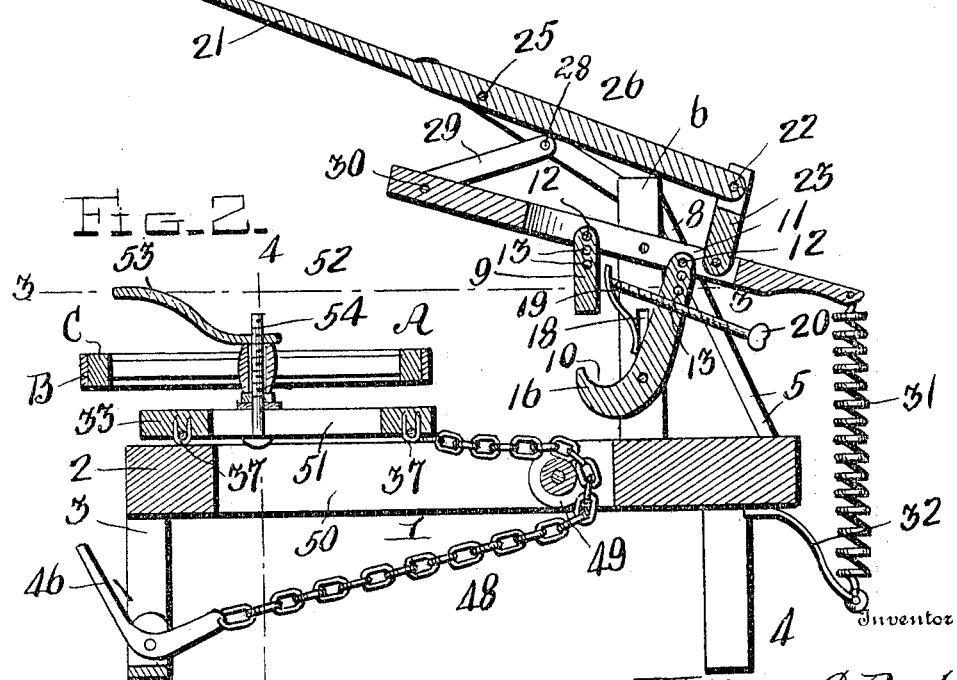
Witnesses
Jas. A. Koehl
L. O. Hilton
Inventor
William C. Poole.
By H. B. Wilson
Attorney No. 798,974. PATENTED SEPT. 5, 1905.
W. C. POOLE.
WHEEL TIRE MACHINE.
APPLICATION FILED OCT. 17, 1904.
2 SHEETS—SHEET 2.
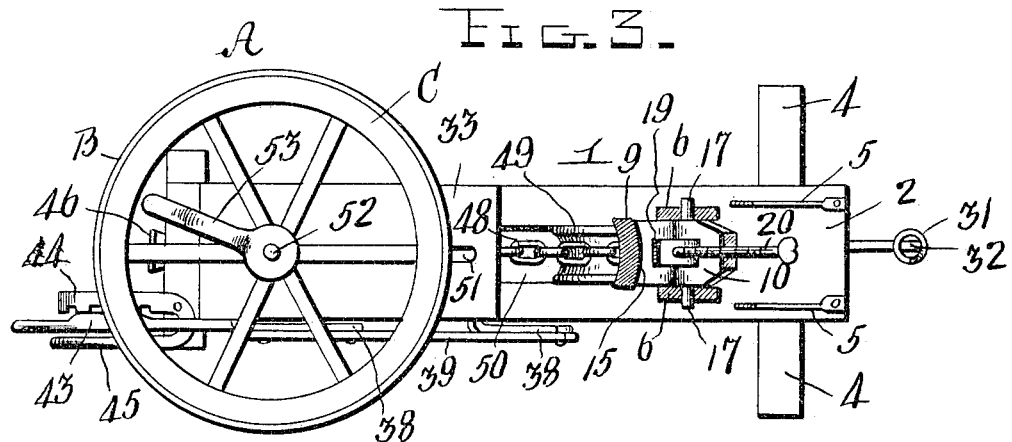
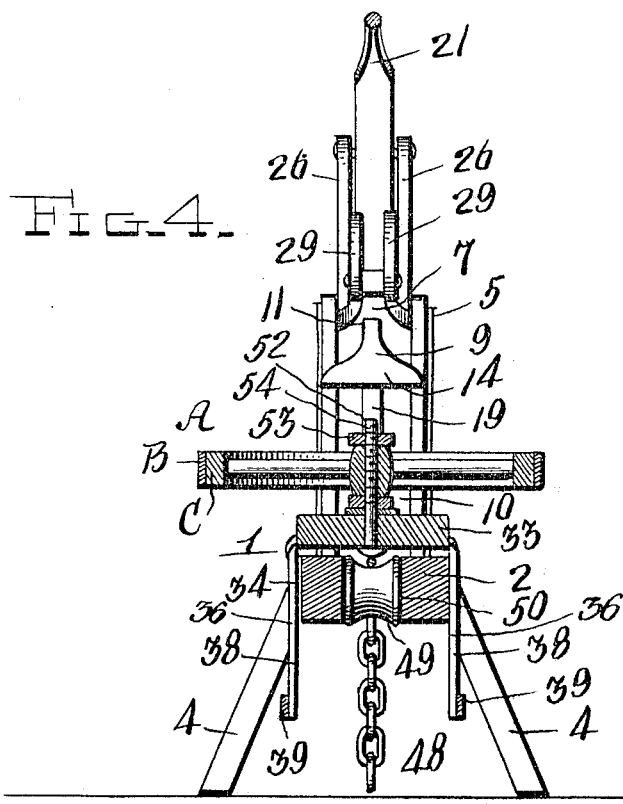
Witnesses
Jas. A. Bachl.
L. O. Hilton.
Inventor
William C. Poole,
By H. R. Wilson
Attorney

UNITED STATES PATENT OFFICE.

WILLIAM C. POOLE, OF MARYSVILLE, CALIFORNIA.

WHEEL-TIRE MACHINE.

No. 798,974.      Specification of Letters Patent.      Patented Sept. 5, 1905.

Application filed October 17, 1904. Serial No. 228,847.

*To all whom it may concern:*

Be it known that I, WILLIAM C. POOLE, a citizen of the United States, residing at Marysville, in the county of Yuba and State of California, have invented certain new and useful Improvements in Wheel-Tire Machines; and I do declare the following to be a full, clear, and exact description of the invention, such as will enable others skilled in the art to which it appertains to make and use the same.

My invention relates to improvements in machines for setting and removing tires from vehicle-wheels; and it consists of certain novel features of construction, combination, and arrangement of parts hereinafter fully described and claimed.

The object of my invention is to provide a simple, durable, and comparatively inexpensive machine of this character by means of which a tire may be quickly and easily applied to or removed from a wheel without the liability of splitting the felly, breaking the tenons of the spokes, or otherwise injuring the wheel.

With this and other objects in view the invention consists of certain novel features of construction, combination, and arrangement of parts, as will be more fully described, and particularly pointed out in the appended claims.

In the accompanying drawings, Figure 1 is a side elevation of my improved tire-machine. Fig. 2 is a vertical longitudinal section through the same. Fig. 3 is a horizontal longitudinal section taken on the line 3 3 in Fig. 2. Fig. 4 is a vertical transverse sectional view taken on the line 4 4 in Fig. 2.

Referring to the drawings by numeral, 1 denotes a suitable frame or stand made, preferably, of wood and comprising a rectangular bed 2, supported in a horizontal position by legs 3 at its front end and legs 4 at its rear end. Projecting vertically from the top of said bed adjacent to its rear end and strengthened by diagonal braces 5 are two spaced uprights 6, upon which the tire setting and removing mechanism is mounted. Said mechanism comprises a rocking-beam 7, pivoted intermediate its ends, as at 8, between the uprights 6 adjacent to their upper ends. From said beam at equal distances from and upon opposite sides of its pivot 8 are suspended upper and lower jaws or dogs 9 and 10, which are adapted to engage the upper and lower sides, respectively, of the wheel A, the tire B of which is to be applied to or removed from its felly C. The connection of said jaws to the beam is preferably effected by forming the portion of said beam upon either side of its pivot 8 with a slot 11, in which the upper ends of the jaws are pivoted, as shown at 12. This connection is also preferably made adjustable by forming said upper ends of the jaws with series of openings 13, through any of which the pivot-pins 12 may be passed in order to lengthen or shorten the jaws, and thus vary their operation. The lower end of the upper jaw 9 is enlarged to form a head 14, which is adapted to engage the upper side or edge of either the felly or the tire and which has its rear face curved, as shown at 15. The lower end of the lower jaw 10 is formed with a hook or lateral projection 16, which is adapted to engage the upper side or edge of either the felly or the tire. Said lower end of the jaw 10 is guided in its movement by studs or pins 17, projecting from its sides and sliding in vertically-disposed slots 18, formed in the uprights 6, as shown.

It will be seen that when the beam 7 is oscillated the jaws 9 and 10 will be moved vertically toward or from each other, owing to the fact that they are pivoted upon opposite sides of the fulcrum of said beam. The relative arrangement of the jaws is such that the upper jaw normally overhangs the lower one, so that when they are moved toward each other the head 14 of the upper jaw will contact with the hook 16 of the lower jaw.

In order to adjust the upper jaw toward and from the lower jaw to permit the machine to operate upon wheels having tires and fellies of different widths or thicknesses, I secure upon the front face of the jaw 10 one end of a spring plate or arm 19, the other end of which is adapted to bear against the rear face of the jaw 9 to hold it away from the jaw 10, and I adjust said spring-arm 19 by means of a set-screw 20, which passes through a screw-threaded opening in the jaw 10, as shown.

The beam 7 is oscillated by means of an operating-handle 21, which extends longitudinally above the machine and has its rear end pivoted at 22 between the arms formed by bifurcating the upper end of a block 23, the lower end of which is pivoted at 24 in the slot 11 in the lever 7. Pivoted at 25 upon opposite sides of the operating-handle intermediate its ends are levers 26, which have their rear or lower ends pivoted at 27 to the inner faces of the upper ends of the uprights 6.

Said levers 26 have pivoted to their inner faces at 28 the ends of levers 29, which have their opposite ends pivoted at 30 upon the opposite sides of the front end of the beam 7. By reason of these connections between the handle 21 and the beam 7 a very powerful toggle leverage is obtained, as will be readily seen. The handle is held elevated and the jaws held in their opened position by means of a coil-spring 31, which has one end connected to the rear end of the beam 7 and its other end attached to a bracket-arm 32, secured to the bed 2, as shown.

In order to support the wheel A and to adjust it in a position to be engaged by the jaws 9 and 10, I provide a table 33 in the form of a rectangular block or plate, which is supported above the front portion of the bed 2 by U-shaped supports 34, pivoted at 35 to the sides of the bed 2, so as to permit said table to move longitudinally and vertically in the arc of a circle and to always maintain a parallel relation with respect to the bed. Said supports have their central portions 36 mounted in bearings 37 upon the bottom of the table, and their arms 38 on the sides of the bed extend downwardly below their pivots 35 and are pivotally connected by links 39, the front end of one of which is pivoted at 40 to the lower end of a right-angular-shaped operating-lever 41, pivoted at its angle, as at 42, upon one side of the bed. The other end of said lever 41 forms a handle and has a flattened portion 43, which serves as a pawl to engage a segmental rack 44, secured upon the front end and top of the bed, as shown. Said rack has a curved integral guide 45, between which and said rack the lever 41 is adapted to swing.

It will be seen that the movement of the table toward and from the bed is similar to that of one member of a parallel rule toward and from the other member and that in whatever position it is swung by operating the lever 41 it will be parallel to the bed and may be securely locked by the engagement of the pawl 43 with one of the notches or teeth of the rack 44. The table may also be moved in one direction by a foot-lever 46, which is right angular in shape and pivoted at its angle at 47 between the legs 3 of the bed. One end of said lever is formed with a foot-piece, and to its other end is attached one end of a chain or other flexible connection 48. Said chain passes rearwardly over a guide-pulley 49, journaled in a longitudinal slot 50, formed in the bed 2, and has its other end secured to the rear end of the table 33.

It will be seen that when the table is in its retracted position (shown in Fig. 2) the depression of the outer end of the foot-lever 46 will draw upon the chain and swing the table rearwardly or toward the jaws 9 and 10. The wheel A to be operated upon is adjustably secured upon the top of the table by forming the latter with a longitudinal slot 51, in which a vertical post 52 is slidably mounted. Said post is adapted to project through the hub of the wheel A, and the latter is held thereon by a handle-nut 53, which is screwed upon the upper screw-threaded end 54 of the post.

The operation of the machine will be readily understood from the foregoing description, taken in connection with the accompanying drawings and the following brief statement. After the wheel has been secured upon the table the latter is swung to the proper elevation by means of the hand-lever 41 or the foot-lever 46 and then secured by the engagement of the pawl 43 with the rack 44. The wheel is then adjusted longitudinally upon the bed by sliding its pivot-post 52 in the slot 51. If it is desired to apply or set a tire upon the felly of a wheel, the jaw 9 is allowed to hang in its normal position, so that when the handle 21 is lowered the said jaw will engage the upper edge of the tire, while the lower jaw 10 will engage the under side of the felly; but when it is desired to remove the tire the set-screw 20 is adjusted to hold the jaw 9 away from the jaw 10, so that the former will engage the upper side of the felly and the latter the under edge of the tire, as will be readily understood.

It will be seen that by means of my improved machine a tire may be quickly and easily applied to or removed from the felly of a wheel and that by the movement of both jaws 9 and 10 an equal pressure or pulling and pushing action is exerted upon the wheel-rim, and hence the tendency of the felly to split or to roll and break the tenons of the spokes is entirely overcome.

While I have shown and described the preferred form of my invention, it will be understood that various changes in the form, proportion, and the minor details of construction may be resorted to without departing from the principle or sacrificing any of the advantages of this invention.

Having thus described my invention, what I claim as new, and desire to secure by Letters Patent, is—

1. A machine of the class described, comprising a suitable support, a rocking beam mounted upon said support, coacting jaws pivotally connected to said beam upon opposite sides of its fulcrum, and means for oscillating said beam to cause said jaws to engage and disengage the opposite sides of the rim of a wheel, substantially as described.

2. A machine of the class described, comprising a suitable support, a beam pivotally mounted in said support, upper and lower rim-engaging jaws pivotally suspended from said beam upon opposite sides of its fulcrum, means for adjusting said jaws toward or from each other, and a lever for oscillating said beam, substantially as described.

3. A machine of the class described, comprising a bed, uprights upon said bed, a beam pivotally mounted upon said uprights, upper and lower jaws hung from said beam upon opposite sides of its center, said lower jaw being guided between said uprights, an adjustable plate for adjusting said upper jaw toward and from said lower jaw, a handle and a toggle-lever connection between said handle, said uprights and said beam, substantially as described.

4. A machine of the class described, comprising a bed, uprights upon said bed, a beam pivotally mounted upon said uprights, an upper jaw adjustably pivoted upon said beam upon one side of its pivot, a hook-shaped lower jaw pivoted upon said beam upon the opposite side of its pivot, means for adjusting said jaws toward and from each other, a spring for operating said beam to hold said jaws apart, and a lever for oscillating said beam to close said jaws, substantially as described.

In testimony whereof I have hereunto set my hand in presence of two subscribing witnesses.

WILLIAM C. POOLE.

Witnesses:
  J. H. STENNETT,
  G. W. ENGEL.